United States Patent [19]

Kubik et al.

[11] 4,132,185

[45] Jan. 2, 1979

[54] METHOD OF FASTENING AN ALUMINUM ANODE TO THE BOTTOM OF A METAL CONTAINER

[75] Inventors: Zbigniew Kubik; Piotr Sieracki; Edmund Skotarczyk, all of Bydgoszcz, Poland

[73] Assignee: Kombinat Opakowan Blaszanych Lekkich "Opakomet", Fabryka Opakowan Blaszanych, Bydgoszcz, Poland

[21] Appl. No.: 783,724

[22] Filed: Apr. 1, 1977

[30] Foreign Application Priority Data

Apr. 9, 1976 [PL] Poland .................................. 188689

[51] Int. Cl.² ............................................. B21D 51/16
[52] U.S. Cl. ............................ 113/120 R; 113/120 A; 29/530

[58] Field of Search .......... 113/120 R, 116 W, 120 A; 29/527.1, 530, 527.5, 527.7, 526; 228/155

[56] References Cited

U.S. PATENT DOCUMENTS 3,557,442  1/1971  Speller .................................. 29/526

Primary Examiner—Michael J. Keenan
Attorney, Agent, or Firm—Haseltine, Lake & Waters

[57] ABSTRACT

Method of fastening an aluminium plate-type anode to the bottom of a tin covered with a protective coat, characterized by that on the metal sheet of the tin bottom (1) provided with a redrawing of an opening the flange thereof is turned inside the tin (1), thereupon the opening (5) of the anode plate (2) is laid and poured over with solder (7) until crowded flashes (9 and 10) are obtained which on cooling down the solder (7) are submitted to pressing by known means in order to flatten them.

2 Claims, 3 Drawing Figures

METHOD OF FASTENING AN ALUMINUM ANODE TO THE BOTTOM OF A METAL CONTAINER

BACKGROUND OF THE INVENTION

This invention relates to a method of fastening an aluminium plate-type anode to the bottom of a tin plated container for preservation of meat in the container, from sulphide discolourations.

A method of fastening aluminum plate-type anode on the inner flat surface of a tin container bottom is known and disclosed in this British Patent No. 1,264,252. According to patent a plate of aluminum anode is laid on with a place stripped of all protective coats. An opening surrounded with a circular hollow is redrawn, and then soft filler metal is poured to fill the opening of the anode plate and simultaneously adheres to the bottom of the tin. On cooling, the filler metal down the seam is flattened.

SUMMARY OF THE INVENTION

The principal features of the present invention are directed to a method of fastening an aluminum plate-type anode to the bottom of a tin plated container covered with a protective coat, including the steps of; redrawing an opening of a flange on the bottom of the container; turning the flange formed of said container inside said container; placing the opening of the anode plate upon a surface and pouring solder until crowded flashes are obtained; cooling the solder; and pressing said flashes until they flatten.

An advantage of the invention is that more reliable fastening of the anode to the bottom of the container occurs, and the anode being so secured is prevented from rotating.

The main object of the invention is to overcome the defects of the prior art.

Another object of the invention is to provide a reliable method of fastening the anode to the bottom of the tin container.

Still another object of the invention is to provide a method of securing the anode in a manner free from rotation.

Other objects and advantages of the invention will be more clearly understood with respect to the accompanying drawings.

IN THE DRAWINGS

PREFERRED EMBODIMENT

Figure 2:
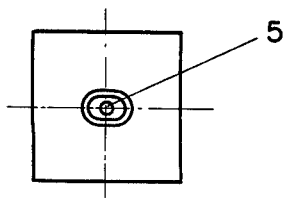
FIG. 2 is the top view of the anode plate.
Figure 1:
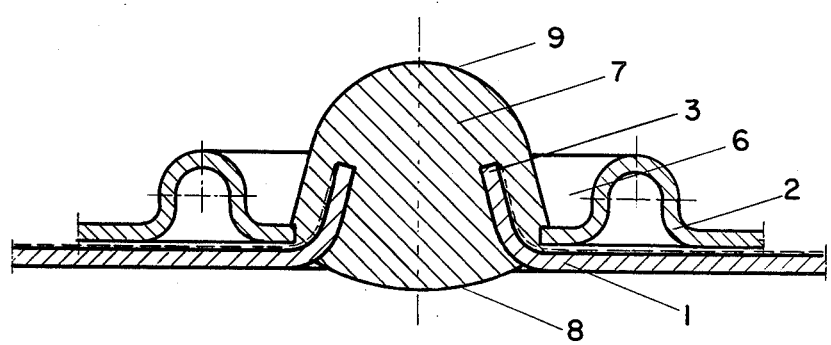
FIG. 1 is the cross-sectional view of the joint between the anode and the bottom of the tin container.
Figure 3:
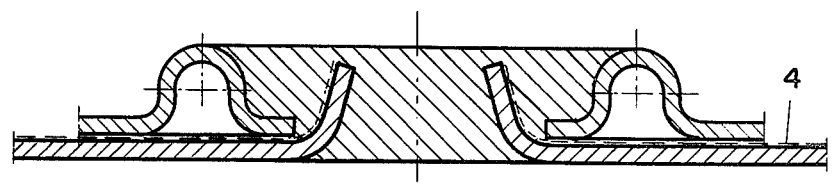
FIG. 3 is the cross-sectional view of the joint between the anode plate and the tin bottom after the flattening operation according to the invention.

According to the FIGS 1-3 an aluminum plate-type anode 2 is fastened to the bottom 1 of the tin plated container in the container bottom 1 by providing an opening with the flange 3 turned inside the container 1. The opening 5 and an oval hollow 6 are made in the aluminum plate of the anode 2. The anode plate 2 is next placed onto the flange 3 of the container bottom 1 and solder 7 is poured until crowded flashes 8 and 9 are obtained. During cooling the solder 7 down the joint is submitted to pressing until said flashes are flattened.

Many modifications and variations of the present invention are possible in light of the above teachings. It is, therefore, to be understood that within the scope of the appended claims, the invention may be practiced otherwise than as particularly described.

We claim:

1. Method of fastening an aluminum plate-type anode to the bottom of a tin plated container covered with a protective coat, including the steps of: providing an opening on the bottom of the container, forming an inwardly directed flange in the area surrounding said opening; placing an (the) anode plate (2) on said container bottom, whereby an opening in said anode plate surrounds said container flange and pouring solder (7) until crowded flashes (9,8) are obtained; cooling the solder (7); and pressing said flashes 9,8 until they flatten.

2. Method as defined in claim 1, including the steps of: surrounding said anode plate (2) with an oval hollow (6).